(12) United States Patent
Wei et al.

(10) Patent No.: US 8,360,181 B2
(45) Date of Patent: Jan. 29, 2013

(54) HYBRID VEHICLE AND HYBRID POWER SYSTEM

(75) Inventors: Tseng-Teh Wei, Hsinchu (TW); Huan-Lung Gu, Hualien County (TW); Yee-Ren Chen, Hsinchu (TW); E-In Wu, Yunlin County (TW); Shih-Ming Lo, Hsinchu (TW); Su-Fa Cheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 13/369,311

(22) Filed: Feb. 9, 2012

(65) Prior Publication Data

US 2012/0135836 A1 May 31, 2012

Related U.S. Application Data

(63) Continuation of application No. 11/692,936, filed on Mar. 29, 2007, now abandoned.

(30) Foreign Application Priority Data

Dec. 28, 2006 (TW) .................................. 95149455 A

(51) Int. Cl.
*B60W 20/00* (2006.01)
(52) U.S. Cl. .................. 180/65.275; 180/65.21; 180/338
(58) Field of Classification Search ............... 180/65.21, 180/65.22, 65.25, 65.265, 65.275, 338; 903/902, 903/905, 906, 907, 915–919; 477/5, 6, 7
See application file for complete search history.

(56) References Cited

U.S. PATENT DOCUMENTS

| | | | | |
|---|---|---|---|---|
| 4,335,429 A | * | 6/1982 | Kawakatsu | 701/102 |
| 5,934,395 A | * | 8/1999 | Koide et al. | 180/65.235 |
| 5,943,918 A | * | 8/1999 | Reed et al. | 74/661 |
| 5,993,351 A | * | 11/1999 | Deguchi et al. | 477/5 |
| 6,064,161 A | * | 5/2000 | Takahara et al. | 318/139 |
| 6,422,331 B1 | * | 7/2002 | Ochiai et al. | 180/65.25 |
| 7,576,501 B2 | * | 8/2009 | Okubo et al. | 318/139 |
| 7,597,164 B2 | * | 10/2009 | Severinsky et al. | 180/65.27 |
| 7,845,444 B2 | * | 12/2010 | Kidokoro et al. | 180/65.235 |

* cited by examiner

Primary Examiner — John Walters
Assistant Examiner — Brian Swenson
(74) Attorney, Agent, or Firm — Jianq Chyun IP Office

(57) ABSTRACT

An operation method of a hybrid vehicle having an automatic manual transmission system adapted to use at least two energy sources is provided with the following steps. Engaging an engine with a starter generator motor such that the engine and the starter generator motor rotate synchronously. Performing a speed changing by using a control unit assembly through controlling rotation speed of the traction motor and a rotation speed of the starter generator motor to a desired rotation speed for the speed changing according to a running state of the vehicle, such that the engine and the traction motor nearly rotate synchronously with the automatic manual transmission system to perform a gear ratio shifting process thereby to perform the speed changing. Controlling an automatic-switching clutch to engage or disengage the engine and the traction motor to achieve a plurality of driving mode for the vehicle.

8 Claims, 13 Drawing Sheets

HYBRID VEHICLE AND HYBRID POWER SYSTEM

CROSS-REFERENCE TO RELATED APPLICATION

This is a continuation application of and claims the priority benefit of U.S. application Ser. No. 11/692,936, filed on Mar. 29, 2007, now pending. The prior application Ser. No. 11/692,936 claims the priority benefit of Taiwan application serial no. 95149455, filed on Dec. 28, 2006. The entirety of each of the above-mentioned patent applications is hereby incorporated by reference herein and made a part of this specification.

BACKGROUND OF THE INVENTION

1. Field of the Invention

The present invention relates to a hybrid vehicle and a hybrid power system.

2. Description of Related Art

With the continuous decrease of global crude oil resources and the increase of petroleum price, all the countries actively seek for other alternative energies and the energy conservation methods to alleviate the impact of petroleum crisis.

Currently, the power sources that can be used in the automobile include fuel (diesel fuel, gasoline) engines, solar energy power systems, and electric drive systems, and so on. Among the above power sources, some have a preferred power effect and superior durability, but actually does not conform to the environmental protection requirement, while others conforms to the environmental protection requirement, but cannot achieve the required power effect.

For example, although an electric automobile and a solar energy automobile do not adopt the conventional fuel engine, the power efficiency of these new power sources is limited. Therefore, it is unfeasible to merely use a single power source.

Then, after diligent research and development, a new concept and technology named hybrid power using two types of power sources in complementation is formed. The hybrid power not only achieves a preferred power effect and a superior durability, but also meets the environmental protection requirement.

In the hybrid power system, because the coupling between various powers is one of the most critical techniques, not all the couplers can be used to couple different powers. In the currently known hybrid power systems, powers are coupled mostly through a torque converter or a planetary gear train, and sometimes through a disc clutch. At present, only the power assistant hybrid system adopts the disc clutch. The system is directly coupled to the crank of the engine by a single motor and rotates coaxially synchronously therewith, or is coupled in series with the transmission main shaft through a gear by using a single motor, and then is coupled with the engine through the disc clutch. However, this system has the following disadvantages.

1. The gear ratio shifting is completed by controlling the rotation speed of a single motor, such that the speed of the shifting is not quick, and the shifting is not smooth, so that it is difficult to improve the efficiency of the transmission.

2. The disc clutches according to the prior art can be substantially classified into two types, namely a mechanical type and a hydraulic type. The mechanical type uses an actuation lever to manipulate the engage and disengage of the clutch mechanically, which has a complicated mechanism and high cost of parts. The hydraulic type directly actuates the clutch by using an oil hydraulic pump to drive the oil cylinder instead of using the lever to actuate the clutch, which has a high cost of the oil hydraulic system, possibly has the oil leakage problem, and is difficult to be assembled and maintained. Moreover, the actuations of the two types are slow, such that the engage and disengage of the clutch are not smooth, and the transmission efficiency is reduced.

SUMMARY OF THE INVENTION

In order to solve the above conventional problems, the present invention is directed to a hybrid power system and vehicle, which has a smooth gear ratio shifting by controlling the rotation speed with a dual-motor. The gear ratio shifting can be performed when the clutch is not disengaged (definitely, the gear ratio shifting can also be performed when the clutch is disengaged), so that the speed changes more smoothly, and the abrasion of the gear ratio shifting device is reduced, thus improving the power transmission efficiency of the automatic manual transmission system.

And, the present invention is directed to a hybrid power system and vehicle, which has a simple clutch mechanism, a lower cost of parts as compared with the conventional art, easy to assemble and maintain, smooth engagement and disengagement of the clutch, thus alleviating the damage caused by an unsmooth engagement of the gear during the gear ratio shifting.

The present invention is also directed to a hybrid power system and vehicle, which uses an automatic-switching clutch to engage and disengage different power sources, so as to switch to different hybrid powers.

An operation method of a hybrid vehicle having an automatic manual transmission system adapted to use at least two energy sources, the operation method comprising the following steps. Engaging an engine with a starter generator motor such that the engine and the starter generator motor rotate synchronously. Using the starter generator motor to start the engine serving as a first power, and using a traction motor as a second power. Performing a speed changing by using a control unit assembly through controlling a rotation speed of the traction motor to a desired rotation speed for the speed changing and a rotation speed of the starter generator motor to a desired rotation speed for the speed changing according to a running state of the vehicle, such that the engine and the traction motor nearly rotate synchronously with the automatic manual transmission system to perform a gear ratio shifting process thereby to perform the speed changing. Controlling an automatic-switching clutch to engage or disengage the engine and the traction motor by using the control unit assembly through a torque/rotation speed control device to achieve a plurality of driving mode for the vehicle, wherein one of the driving mode uses the starter generator motor as an assistant power.

The operation method further comprises an operation of the control unit assembly as followings. Sending a control signal according to the running state of the vehicle with a hybrid vehicle control device, controlling an operation of the engine with an engine control device according to the control signal, controlling an operation of the starter generator motor with a starter generator motor control device according to the control signal, controlling an operation of the traction motor with a traction motor control device according to the control signal, controlling an operation of the speed changing with a torque/rotation speed control device according to the control signal, wherein the torque/rotation speed control device controls the automatic-switching clutch to engage or disengage the engine and the automatic manual transmission system and controls the automatic manual transmission system to perform the speed changing by controlling the rotation speed of the starter generator motor and the rotation speed of the traction motor, and controlling a battery coupled to the starter generator motor and the traction motor to be charged by the starter generator and the traction motor according to the control signal.

The operation method further comprises: determining an optimal power type according to the rotation speed and a torque of the engine, and outputting the control signal and selecting a mode from among a pure electric power mode, a pure engine power mode, a series hybrid power mode, an assistant hybrid power mode, and a parallel hybrid power mode, wherein when the pure electric power mode is selected, the control signal is controlling the automatic-switching clutch to disengage the engine from the automatic manual transmission system, and stopping the operation of the engine, and only the traction motor is used to drive the vehicle, when the series hybrid power mode is selected, the control signal is controlling the automatic-switching clutch to disengage the engine from the automatic manual transmission system, and controlling the engine to drive the starter generator motor to generate a power and to supply the power to the battery, and the battery supplies the power to the traction motor, such that the traction motor drives the vehicle, when the pure engine power mode is selected, the control signal is controlling the automatic-switching clutch to engage the engine with the automatic manual transmission system, and stopping the operation of the traction motor, and only the engine is used to drive the vehicle, when the assistant hybrid power mode is selected, the control signal is controlling the automatic-switching clutch to engage the engine with the automatic manual transmission system, and the engine, the starter generator motor, and the traction motor are used together to drive the vehicle, and when the parallel hybrid power mode is selected, the control signal is controlling the automatic-switching clutch to engage the engine and the automatic manual transmission system, and the starter generator motor supplies a power to the battery or not according to the running state of the vehicle, and the engine and the traction motor are used to drive the vehicle.

The automatic-switching clutch is an electromagnet-controlled disc clutch.

According to the features of the present invention, the gear ratio shifting process of the automatic manual transmission system is achieved by controlling the rotation speed of the starter generator motor and the traction motor, so that the speed changing of the transmission system becomes smoother.

According to the features of the present invention, the automatic-switching clutch can be used in the hybrid power system/hybrid vehicle to switch to different energy flow. The power-type-controlling unit (control unit assembly) then selects an optimal power type according to the operation state of the hybrid system/the running state of the vehicle, thus achieving the effect of power saving, low pollution, and output enhancement.

According to the features of the present invention, when an electromagnetic disc clutch or a centrifugal clutch is used as the automatic-switching clutch, due to the small volume, it is easy for the hybrid power system to arrange the relative position of each component, such that different types of hybrid power systems are assembled in a modularized way, and different hybrid vehicles are produced according to the requirement on the vehicle application and cost. It is preferred that, when the electromagnetic disc clutch is used as a clutch for changing power mode, the disengagement or engagement can be performed at any rotation speed, and the velocity of engaging or disengaging can be controlled accurately, so as to avoid the torque impact.

In order to make the aforementioned and other objectives, features and advantages of the present invention comprehensible, preferred embodiments accompanied with figures are described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

The First Embodiment

[Hybrid Vehicle]

Figure 1:
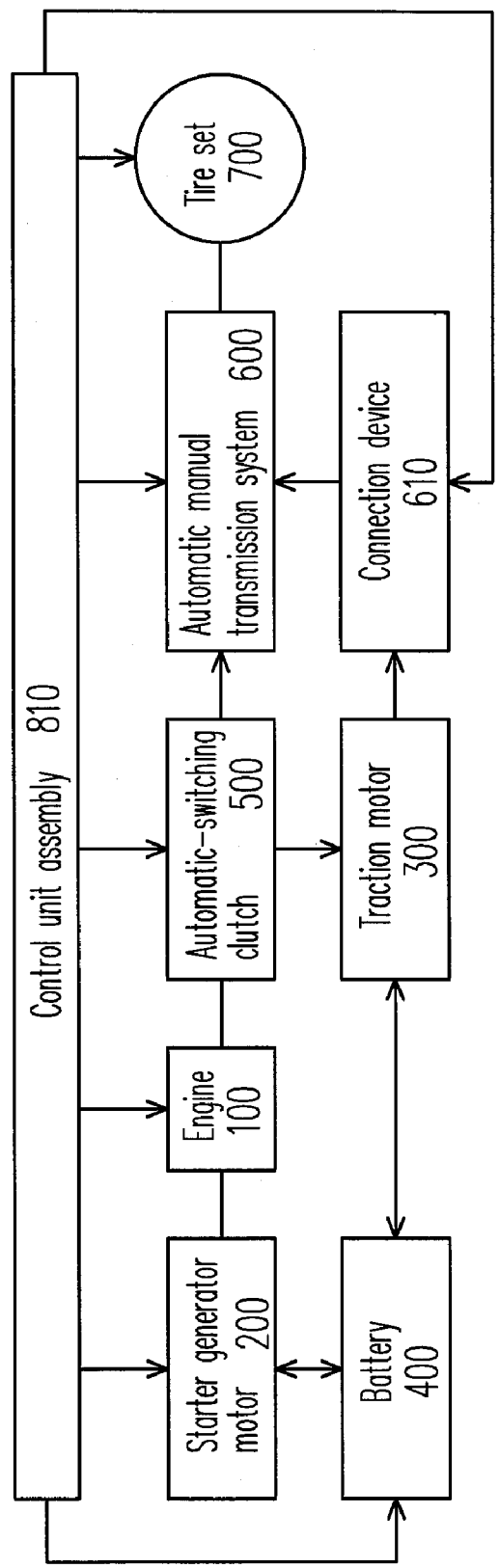
FIG. 1 is a block diagram of a hybrid vehicle according to the first embodiment of the present invention.

FIG. 1 is a block diagram of a hybrid vehicle according to a first embodiment of the present invention.

The hybrid vehicle using at least two energies of the present invention includes an engine 100 serving as a first power, a starter generator motor 200, a traction motor 300 serving as a second power, a battery 400, an automatic-switching clutch 500, an automatic manual transmission system 600, a connection device 610, a tire set 700 and a transmission shaft (not shown), and a control unit assembly (a power-type-controlling unit) 810.

The starter generator motor 200 for starting the engine is coupled with the engine 100, and synchronously rotates with the engine 100 and serving as an assistant power.

The automatic manual transmission system 600 is coupled with the traction motor 300 through a connection device 610. Herein, the connection device, for example, includes a gear set, a sprocket and chain set, a belt and pulley set. The automatic manual transmission system 600 performs a seed changing under a controlling of the rotation speed of the starter generator motor 200 and the traction motor 300.

The battery 400 is coupled with the starter generator motor 200 and the traction motor 300.

The automatic-switching clutch 500 is coupled between the starter generator motor 200 and the automatic manual transmission system 600 to make them be engaged or disengaged so as to switch the power. The above automatic-switching clutch 500 is an electromagnet-controlled disc clutch or centrifugal clutch.

The automatic manual transmission system 600 is coupled with the tire set 700 through a transmission shaft (not shown).

The control unit assembly 810 controls the automatic-switching clutch 500 to engage or disengage the engine 100 and the traction motor 300 according to the running state of the vehicle.

[Examples of Mechanical Arrangement of Automatic-Switching Clutch]

[Mechanical Arrangement Example 1]

Figure 2:
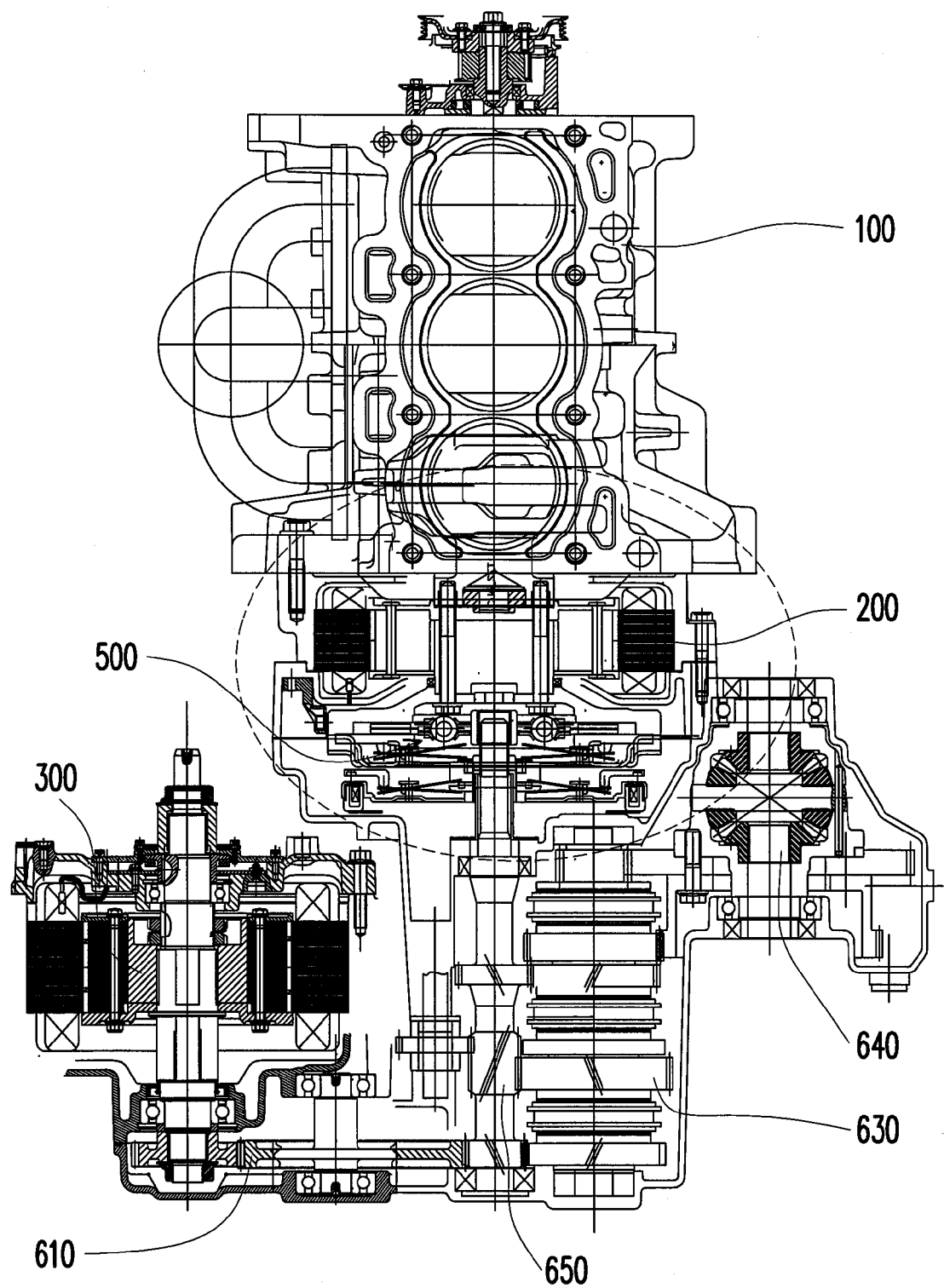
FIG. 2 shows a mechanism arrangement Example 1 according to the first embodiment of the present invention.
Figure 3:
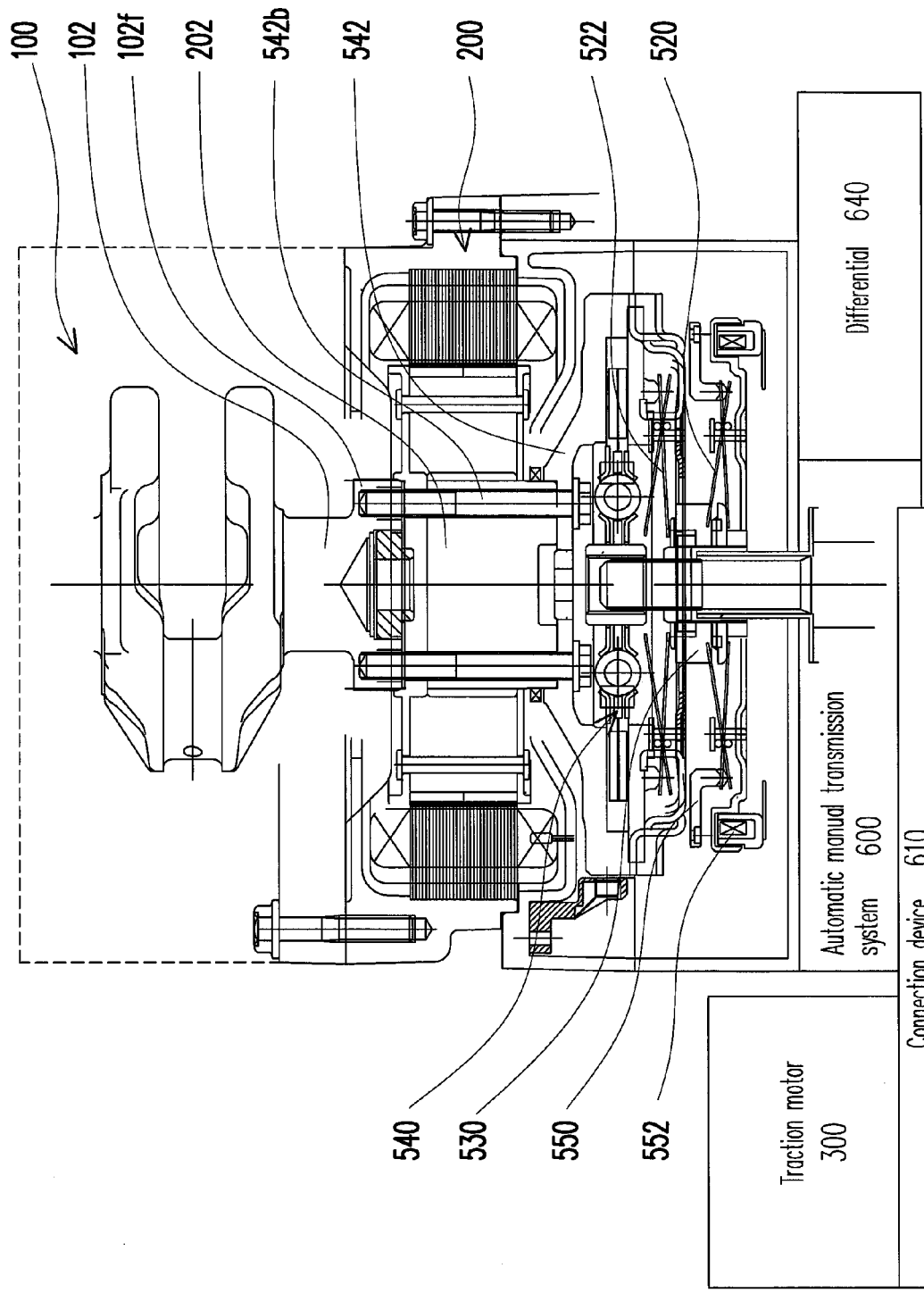
FIG. 3 is a partial enlarged view of FIG. 2.

Referring to FIGS. 2 and 3, FIG. 2 is a schematic view of a mechanical arrangement of the above components according to Example 1, and FIG. 3 is a partial enlarged view of the dashed area of FIG. 2.

The starter generator motor 200 and the automatic-switching clutch 500 (for example, an electromagnetic disc clutch) are arranged on the same side of the engine 100. The starter generator motor 200 adopts an inner rotor design. A clutch flywheel 542 is directly locked onto a flange coupling 102f on the left end of the engine crank 102 by using a screw 524b passing through a rotor 202. The engine 100 and the starter generator motor 200 are engaged with each other through screws, thereby the engine 100 and the starter generator motor 200 rotate synchronously.

The automatic manual transmission system 600 is connected to a transmission main shaft 650 through a differential 640 and then connected to the tire set 700 (FIG. 1).

[Mechanical Arrangement Example 2]

Figure 4:
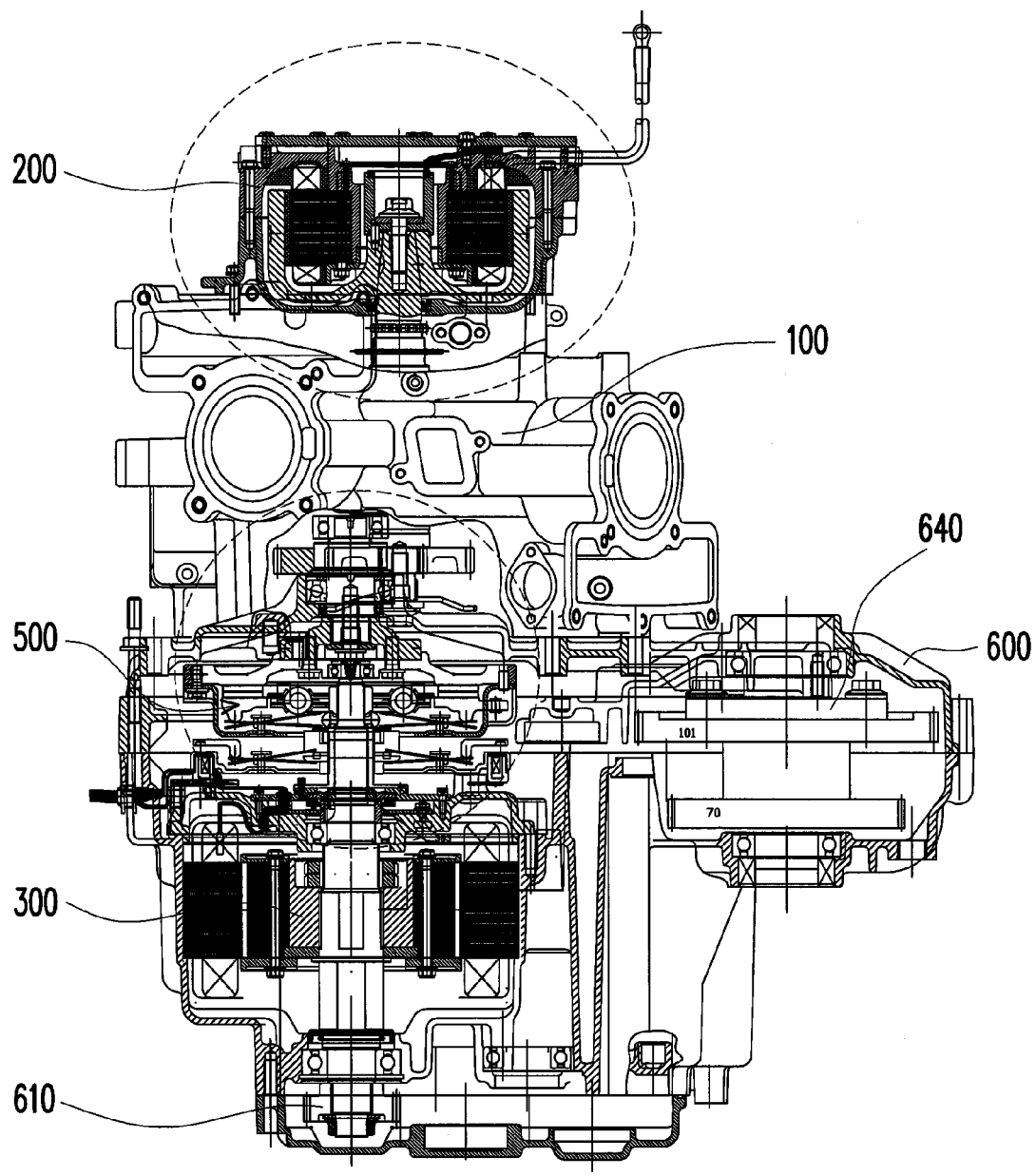
FIG. 4 shows a mechanism arrangement Example 2 according to the first embodiment of the present invention.
Figure 5:
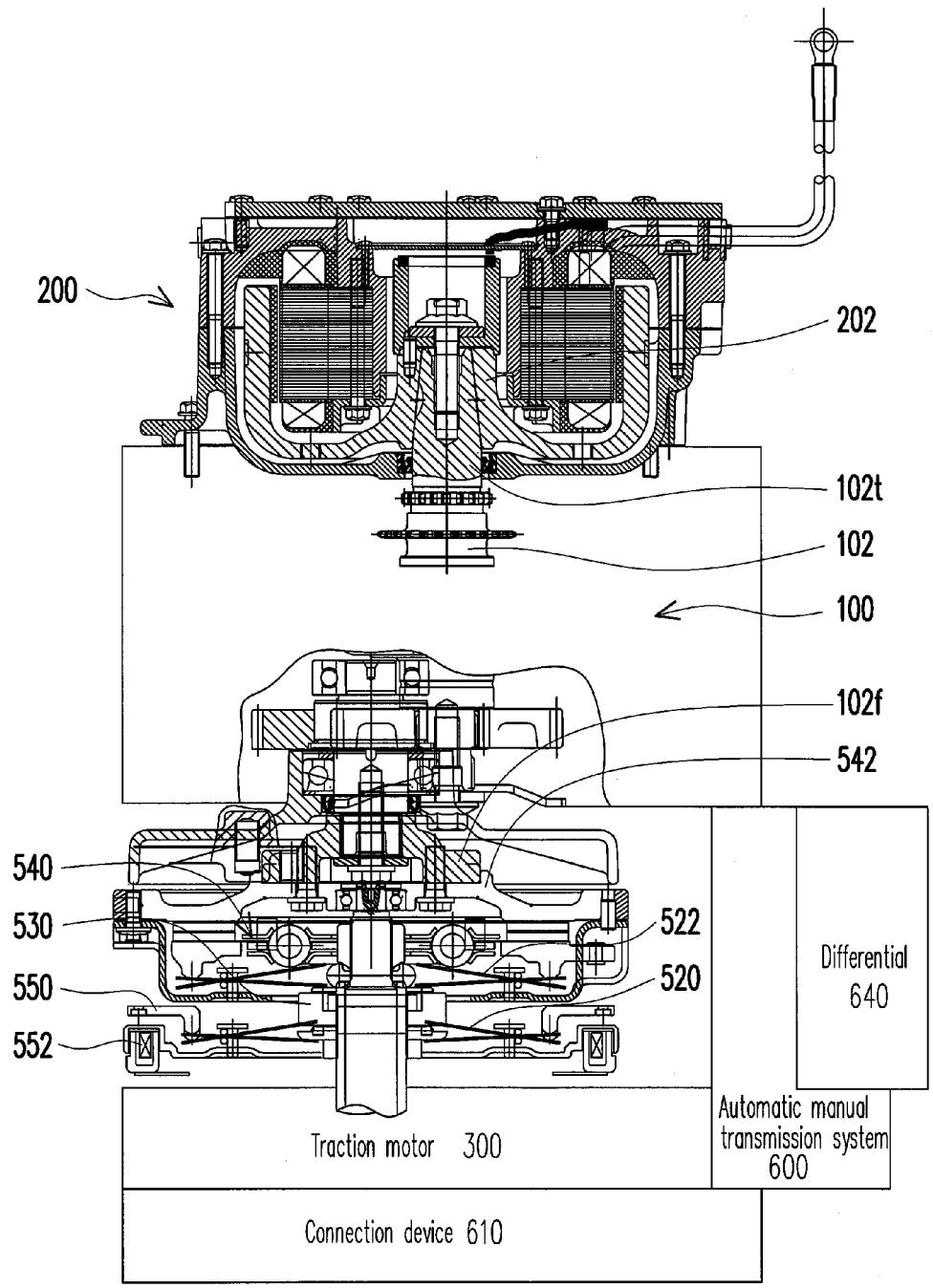
FIG. 5 is a partial enlarged view of FIG. 4.

Referring to FIGS. 4 and 5, FIG. 4 is a schematic view of a mechanical arrangement of the above components according to Example 2, and FIG. 5 is a partial enlarged view of the dashed area of FIG. 4.

The starter generator motor 200 and the automatic-switching clutch 500 (for example, an electromagnetic disc clutch) are arranged on two sides of the engine 100.

The starter generator motor 200 adopts an outer rotor design. The rotor 202 is directly locked onto a tapered shaft 102t on the right end of the engine crank 102 by using screws, which is an example of engaging the engine and the starter generator motor. A clutch flywheel 542 is directly locked onto a flange coupling 102f on the left end of the engine crank 102. The engine 100 and the starter generator motor 200 are engaged with each other through screws, thereby the engine 100 and the starter generator motor 200 rotate synchronously.

The automatic manual transmission system 600 is connected to a transmission main shaft 650 through a differential 640 and then connected to the tire set 700 (FIG. 1).

In the above two mechanical arrangement examples, the disengagement or engagement of the clutch flywheel 542 and the clutch set 540 involves utilizing the attractive force of an electromagnetic coil 552 to an electromagnetic chuck 550 to move the electromagnetic chuck 550. An electromagnetic disc lever spring 520 is actuated by the move of the electromagnetic chuck 550, then a release bearing 530 is pushed, and a clutch lever spring 522 is actuated, so as to disengage or engage the clutch flywheel 542 and the clutch set 540.

When the disc clutch is actuated by means of electromagnetism, a microcomputer (not shown) can be used together to control and drive an electromagnetic jig holder, so as to control the open and close of the disc clutch accurately. Thus, the disc clutch is made to have an appropriate engaging or disengaging speed, so that various hybrid power systems having a complete function of automatic-control engaging and disengaging can be formed.

Also, as the size of the automatic electromagnetic disc clutch mechanism is thin in space, it is easy for the hybrid power system to arrange the relative position of each component, such that different types of hybrid power systems can be assembled in the modularized way. Therefore, as compared with the conventional art, the present invention has a lower cost and diverse functions.

[Mechanical Arrangement Example 3]

In the above two mechanical arrangement examples, the electromagnetic disc clutch is used as the automatic-switching clutch 500. Definitely, a centrifugal clutch can also be used according to the spirit of the present invention. The centrifugal clutch is designed to perform the engagement in the range of the operation efficacy curve of the engine where minimum fuel is consumed and the pollution is in a low level.

Figure 6:
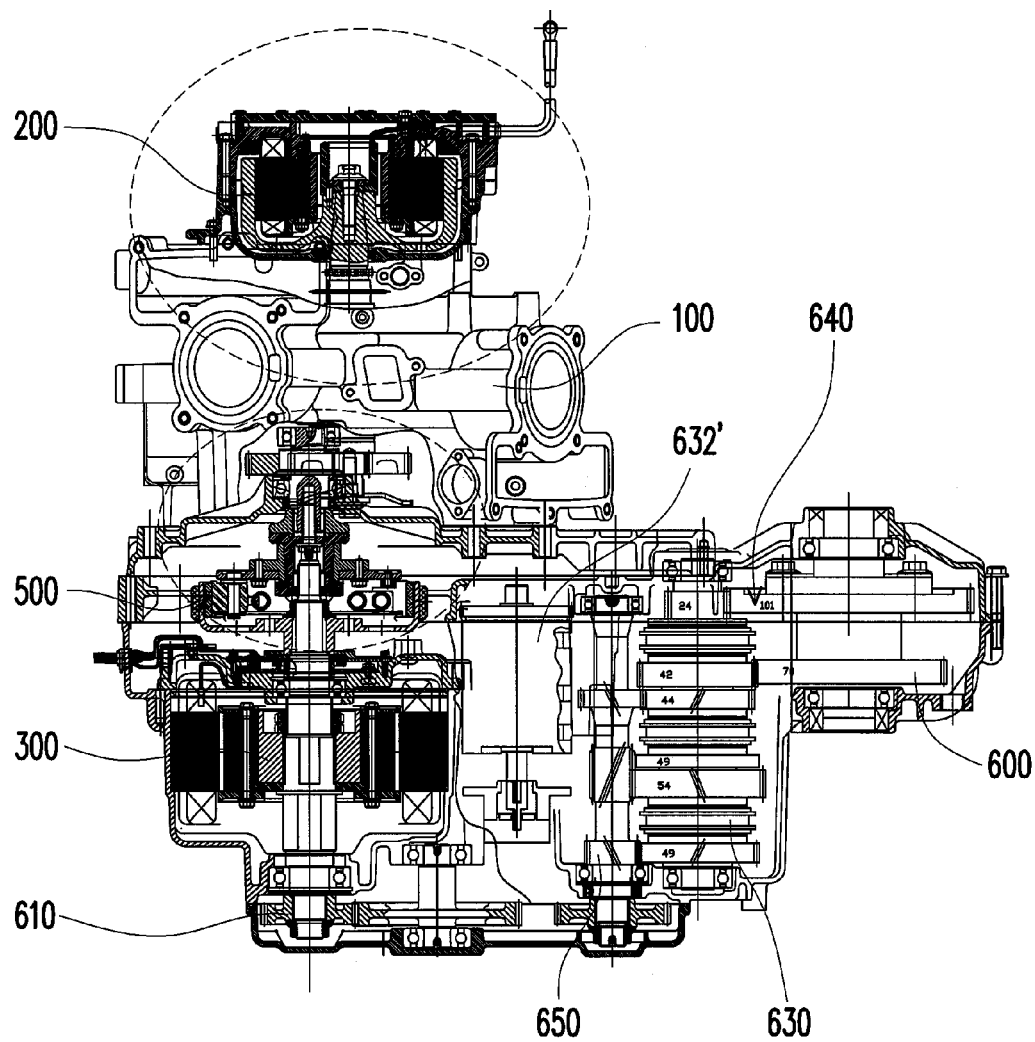
FIG. 6 shows a mechanism arrangement Example 3 according to the first embodiment of the present invention.
Figure 7:
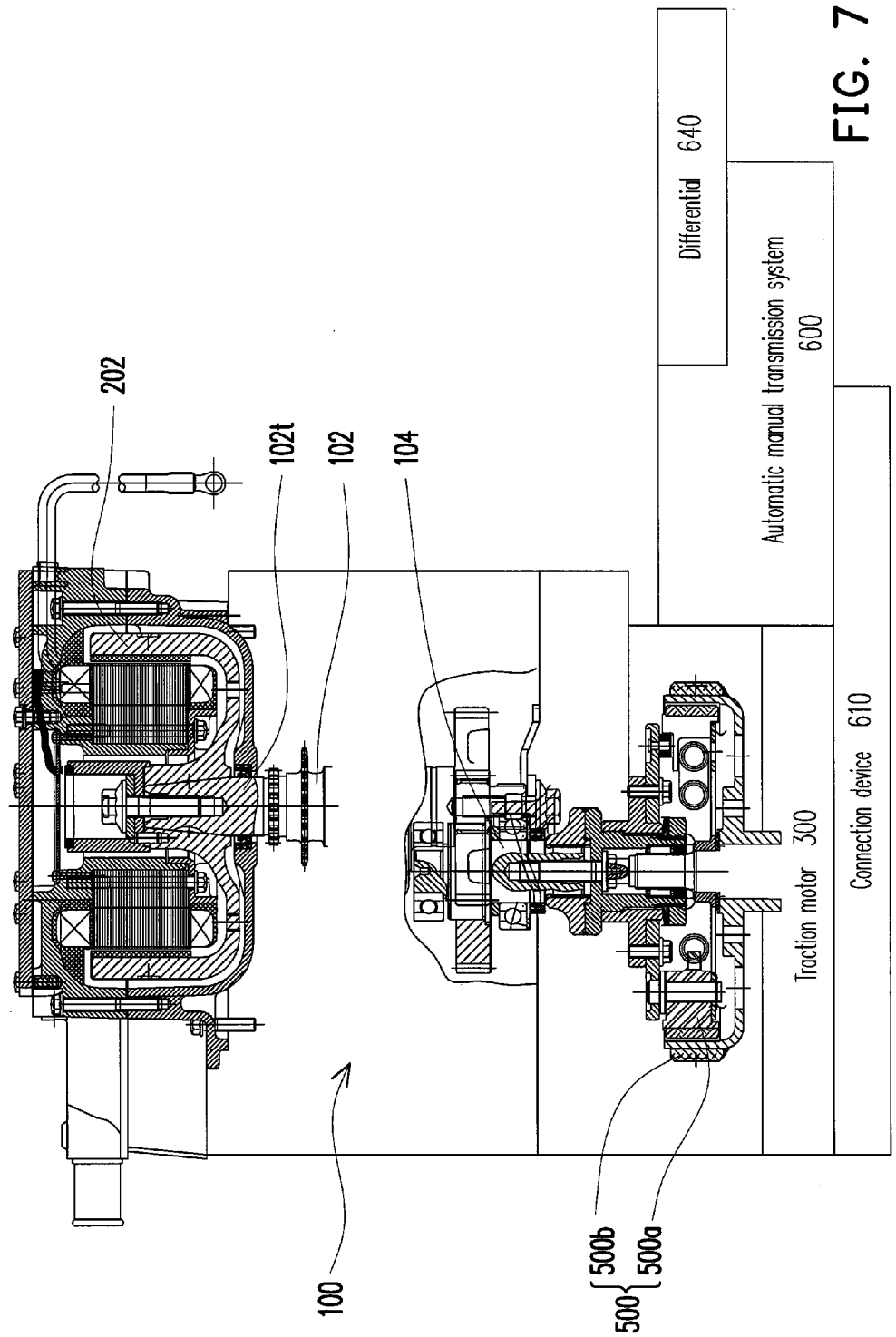
FIG. 7 is a partial enlarged view of FIG. 6.

The mechanical arrangement is shown in FIGS. 6 and 7. FIG. 6 is a schematic view of a mechanical arrangement of the above components according to Example 3, and FIG. 7 is a partial enlarged view of the dashed area of FIG. 6. The same numerals are used to indicate the same elements appearing in different arrangement examples, so the details will be omitted.

The starter generator motor 200 and the automatic-switching clutch 500 (for example, the centrifugal clutch) are arranged on two sides of the engine 100. The starter generator motor 200 adopts an outer rotor design. The rotor 202 is directly locked onto a tapered shaft 102t on the right end of the engine crank 102. The centrifugal clutch 500 is locked onto the output shaft 104 of the engine. The engine 100 and the starter generator motor 200 are engaged with each other through screws, thereby the engine 100 and the starter generator motor 200 rotate synchronously. The using of screws to engage the engine and the starter generator motor is merely an example for engaging and shouldn't limit the engagement of the present invention into just screwing.

When the centrifugal clutch is adopted as the automatic-switching clutch 500, a centrifugal block 500a and the clutch hub 500b are disengaged in a static state. The centrifugal block 500a when rotating is forced to extend externally by a centrifugal force, and can be engaged with the clutch hub 500b when the centrifugal block 500a reaches a certain rotation speed (as shown in FIG. 7).

The automatic manual transmission system 600 is connected to a transmission main shaft 650 through a differential 640 and then connected to the tire set 700 (FIG. 1).

Likewise, due to the small volume of the centrifugal clutch, it is easy for the hybrid power system to arrange the relative position of each component, such that different types of hybrid power systems can be assembled in a modularized way. Therefore, as compared with the conventional art, the present invention has a lower cost and diverse functions.

[Gear-Shifting Assembly Mechanism]

The above automatic manual transmission system 600 further includes a gear-shifting assembly mechanism 633 (FIG. 8), a transmission main shaft 650, and a differential 640. Firstly, referring to FIG. 6, a conventional gear-shifting assembly mechanism, gear-shifting cam 632' is shown. The gear-shifting assembly mechanism in FIGS. 2 and 4 also uses the conventional gear-shifting cam, but is not shown due to the angle of view.

Figure 8:
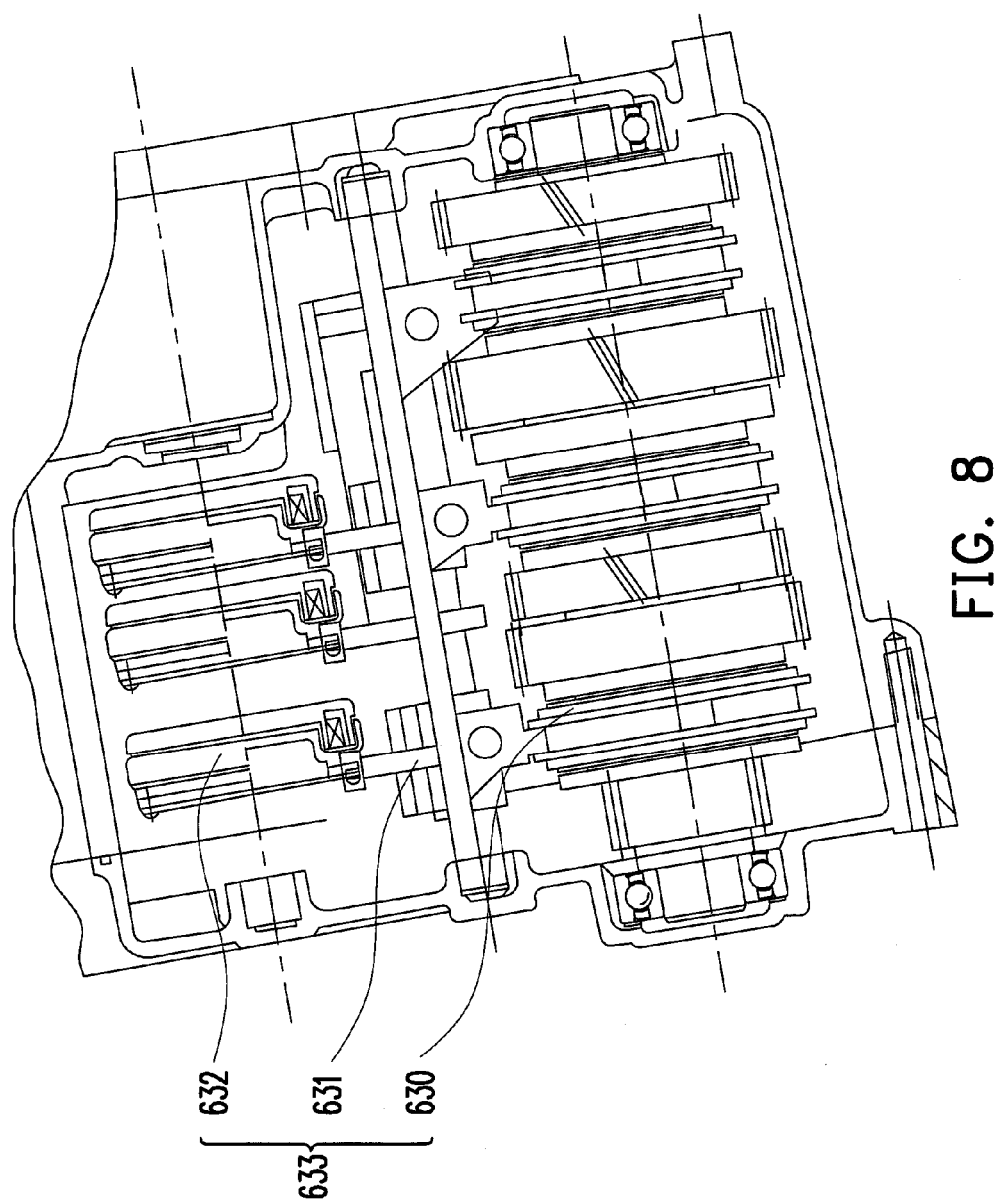
FIG. 8 is a schematic view of a gear-shifting assembly mechanism according to the first embodiment of the present invention.

Referring to FIG. 8, the gear-shifting assembly mechanism 633 of the present invention uses a gear-shifting electromagnetic disc 632 instead of the conventional gear-shifting assembly mechanism, gear-shifting cam 632'.

The gear-shifting assembly mechanism 633 is an electromagnet-actuated electromagnetic disc or the conventional "gear-shifting assembly mechanism, gear shifting cam", and the electromagnetic disc clutch is taken as an example in FIG. 8. When shifting, the gear-shifting electromagnetic disc 632 actuates a transmission fork set 631, such that the synchronizer 630 enters a desired gear position. The detailed gear ratio shifting process and the control are given below.

Definitely, besides the electromagnet-actuated electromagnetic disc gear-shifting assembly mechanism (as shown in FIG. 8), the conventional "gear-shifting assembly mechanism, gear-shifting cam (as shown in FIG. 6)" also can be used.

[Control Unit Assembly]

Figure 9:
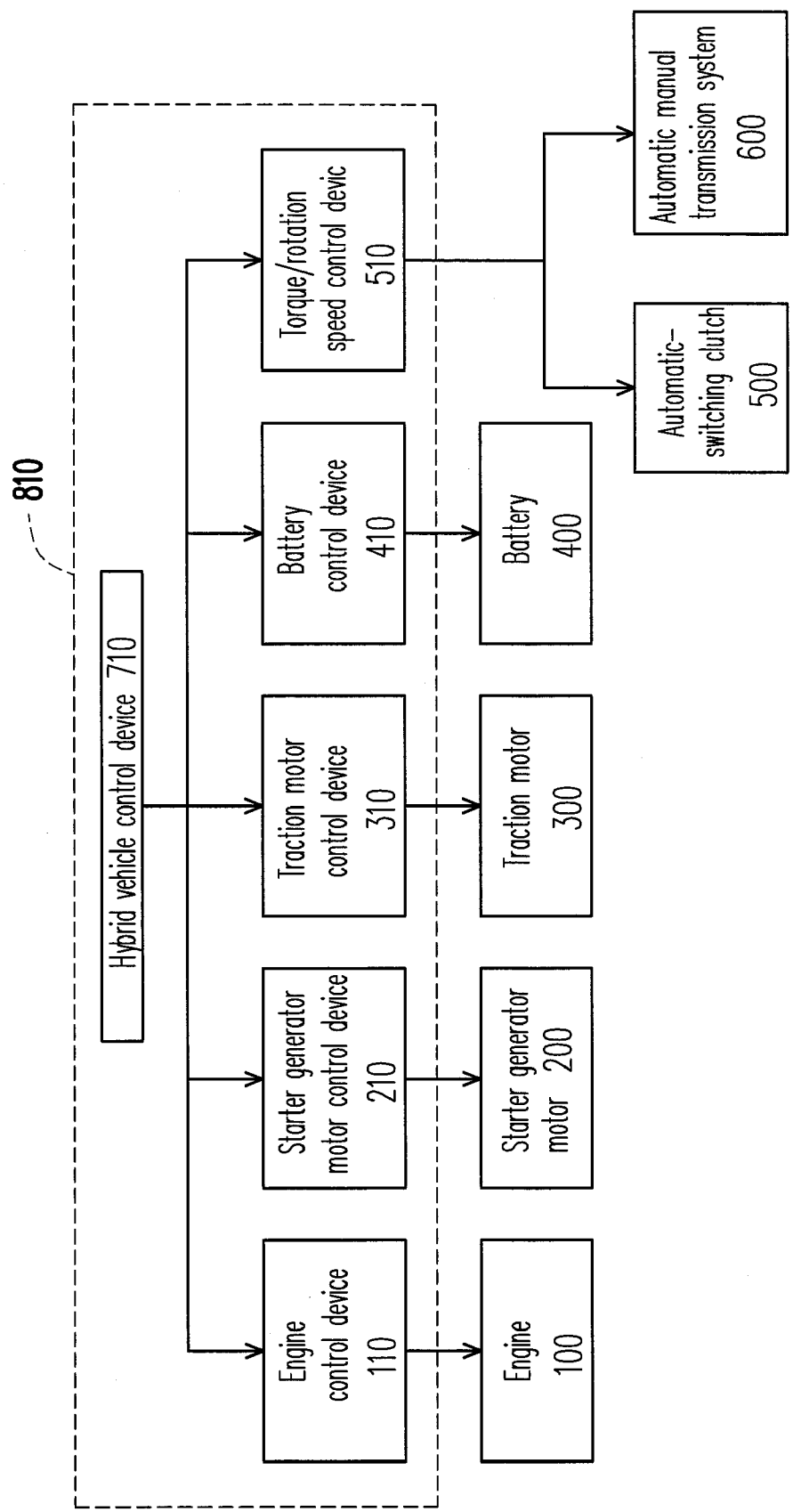
FIG. 9 is a block diagram of a control unit assembly according to the first embodiment of the present invention.

FIG. 9 is a block diagram of a control unit assembly of a hybrid vehicle according to a preferred embodiment of the present invention.

The control unit assembly 810 includes an engine control device 110, a starter generator motor control device 210, a traction motor control device 310, a battery control device 410, a torque/rotation speed control device 510, and a hybrid vehicle control device (master control device) 710.

The hybrid vehicle control device (master control device) 710 sends a control signal according to the operation state such as the running state of vehicle, the rotation speed and torque of the engine of the hybrid power system.

The engine control device 110 is connected with the engine 100 and the hybrid vehicle control device 710 through a control circuit for controlling the operation of the engine 100.

The starter generator motor control device 210 is connected with the starter generator motor 200 and the hybrid vehicle control device 710 through a control circuit for controlling the operation of the starter generator motor 200.

The traction motor control device 310 is connected with the traction motor 300 and the hybrid vehicle control device 710 through a control circuit for controlling the operation of the traction motor 300.

The torque/rotation speed control device 510 is connected with the automatic manual transmission system 600, the automatic-switching clutch 500, and the hybrid vehicle control device 710 through a control circuit. The torque/rotation speed control device 510 receives and interprets the control signal sent by the hybrid vehicle control device 710 for controlling the engagement and disengagement of the automatic-switching clutch 500, and controlling the automatic manual transmission system to perform a speed changing under a controlling for the rotation speed of the starter generator motor 200 and the traction motor 300 through the starter generator motor control device 210 and the traction motor control device 310 with the hybrid vehicle control device 710.

The battery control device 410 is connected with the battery 400 and the hybrid vehicle control device 710 through a control circuit. The battery control device 410 receives and interprets the control signal sent by the hybrid vehicle control device 710 to control the battery 400 to be charged by the starter generator motor 200 and the traction motor 300 according to the control signal, so as to adjust the power supplied by the battery 400 to the starter generator motor 200 and the traction motor 300, and adjust the power stored from the starter generator motor 200 and the traction motor 300.

When the control signal sent by the hybrid vehicle control device is interpreted to indicate to switch the power type, the torque/rotation speed control device 510 controls the automatic-switching clutch 500 so as to engage or disengage the engine 100 and the automatic manual transmission system 600. Thus, the traction motor 300 is engaged with the engine 100 through the automatic manual transmission system 600 and the automatic-switching clutch 500.

When the control signal is interpreted to indicate to shift gear, the torque/rotation speed control device 510 controls the automatic manual transmission to perform the speed changing under a controlling for the starter generator motor 200 and the traction motor 300 through the starter generator motor control device 210 and the traction motor control device 310 to reach a predetermined rotation speed, and drive the engine 100 to reach the predetermined rotation speed, so as to perform the gear ratio shifting process.

[Full Type Hybrid Power]

The above hybrid vehicle control device 710 determines an optimal power according to the rotation speed and torque of the engine 100, and sends a control signal. Thus, one mode is selected from among a pure electric power mode, a pure engine power mode, a series hybrid power mode, an assistant hybrid power mode, and a parallel hybrid power mode.

For example, when the vehicle runs at a low speed in a street, the pure electric power mode can be selected. When the engine 100 operates in the range of the operation efficiency curve where the minimum fuel is consumed and the pollution is in a low level, the series hybrid power mode is selected. When the voltage of the battery 400 is insufficient, the pure engine power mode is selected. When a large horse power or a large torque drive is needed, the assistant hybrid power mode is selected. However, since the battery 400 has a limited capacity and cannot last for long, the started generator motor 200 is needed to generate power to the battery 400. The traction motor 300 and the engine 100 are used to drive the vehicle, which is referred to as the parallel hybrid power mode. In this way, a longer endurance and a larger horse power and torque are provided as compared with the conventional vehicles.

Referring to FIG. 1, when the pure electric power mode is selected, the control signal is transferred to the torque/rotation speed control device 510 for disengaging the automatic-switching clutch 500 and stopping the operation of the engine 100, and only the traction motor 300 is used to drive the vehicle, which is referred to as a pure electric vehicle (PEV).

When the series hybrid power mode is selected, the control signal is transferred to the torque/rotation speed control device 510 for disengaging the automatic-switching clutch 500, such that the engine 100 drives the starter generator 200 to generate power and supplies power to the battery 400, and the battery 400 supplies power to the traction motor 300, such that the traction motor 300 is used to drive the vehicle.

When the pure engine power mode is selected, the control signal is transferred to the torque/rotation speed control device 510 for engaging the automatic-switching clutch 500 and stopping the operation of the traction motor 300, and only the engine 100 is used to drive the vehicle.

When the assistant hybrid power mode is selected, the control signal is transferred to the torque/rotation speed control device 510 for engaging the automatic-switching clutch 500, and the engine 100, the starter generator motor 200, and the traction motor 300 are used together to drive the vehicle, which is referred to as a power assistant hybrid electric vehicle (PAHEV).

When the parallel hybrid power mode is selected, the control signal is transferred to the torque/rotation speed control device 510 for engaging the automatic-switching clutch 500, and the starter generator motor 200 supplies power to the battery 400 or not according to the running state of the vehicle, thus the engine 100 and the traction motor 300 are used to drive the vehicle.

Five different powers can be derived from the present invention, and thus it is referred to as a full type HEV by the inventor of the present invention.

[Control Process of Power-Type-Controlling Unit (Control Unit Assembly)]

Figure 10:
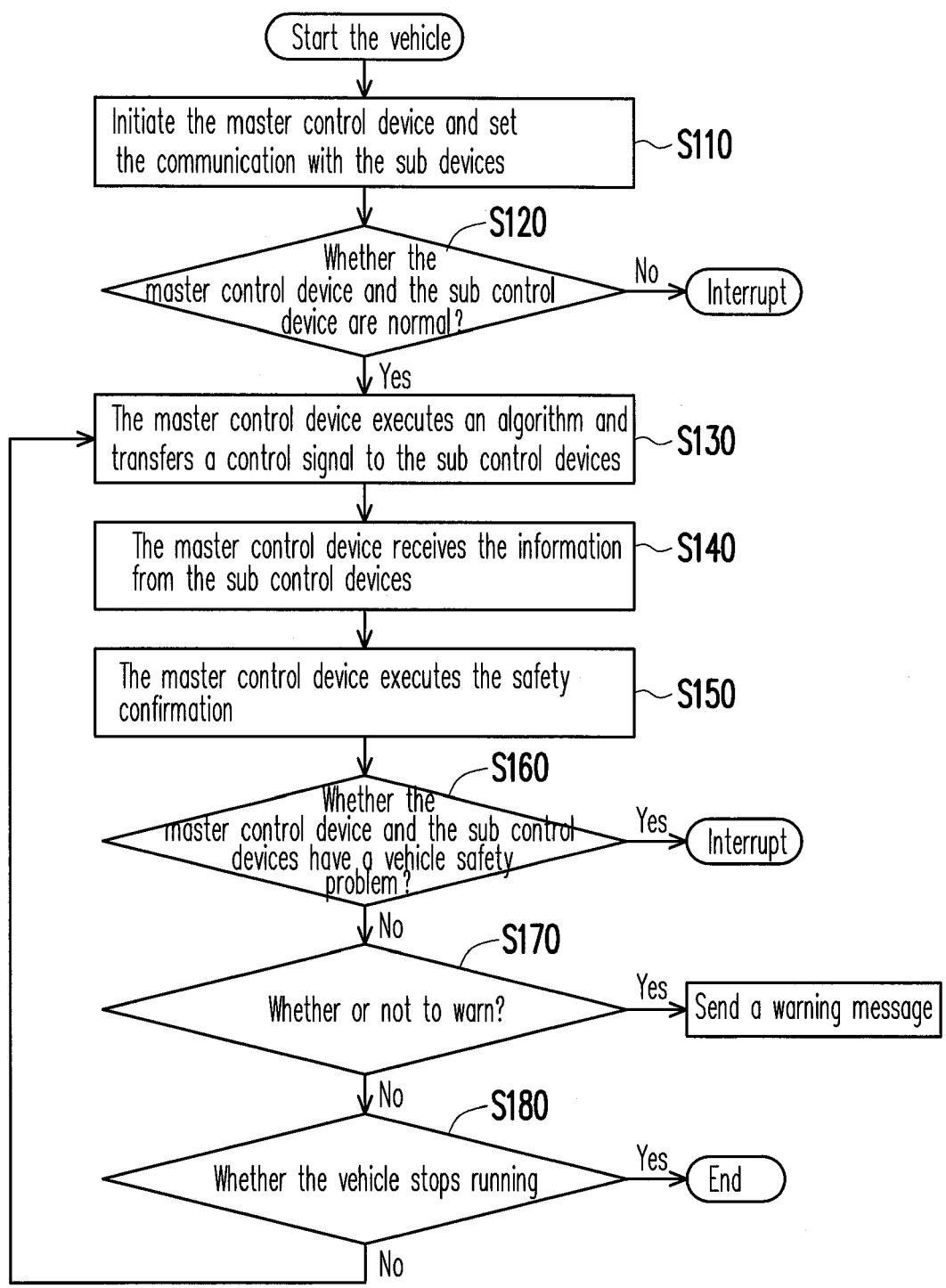
FIG. 10 is a schematic view of a control process of the control unit assembly according to the first embodiment of the present invention.

FIG. 10 shows the control process of the power control unit assembly, which comprises the following steps.

When the vehicle is started, the step S110 is conducted to initiate the hybrid vehicle control device 710, and set the communication between the hybrid vehicle control device 710 and the engine control device 110, the starter generator motor control device 210, the traction motor control device 310, the torque/rotation speed control device 510, and the battery control device 410. The hybrid vehicle control device 710 is also referred to as a master control device, hereinafter, the engine control device 110, the starter generator motor control device 210, the traction motor control device 310, the torque/rotation speed control device 510, and the battery control device 410 are all referred to as sub control devices.

In the step S120, it is determined whether the hybrid vehicle control device 710 and the sub control devices are normal or not. If no, the control process is interrupted. Otherwise, proceed to the next step S130.

In the step S130, the hybrid vehicle control device 710 executes an algorithm and transfer the control signal to the sub control devices.

In step S140, the hybrid vehicle control device 710 receives information from the sub control devices.

In the step S150, the hybrid vehicle control device 710 executes a safety confirmation.

In the step S160, it is determined whether the hybrid vehicle control device 710 and the sub control devices have the vehicle safety problems or not. If yes, the control process is interrupted. Otherwise, proceed to the next step S170.

In the step S170, it is determined whether the hybrid vehicle control device and the sub control devices have the vehicle safety problems or not. If yes, a warning message is sent out. Otherwise, proceed to the next step S180.

In step S180, it is determined whether the vehicle stops running or not. If yes, the control process is terminated. Otherwise, the process returns to the step S130 of making the master control device to execute an algorithm and transferring the control signal to the sub control devices.

[Gear Ratio Shifting Control Process]
[Electromagnetic Disc Clutch]

Figure 11:
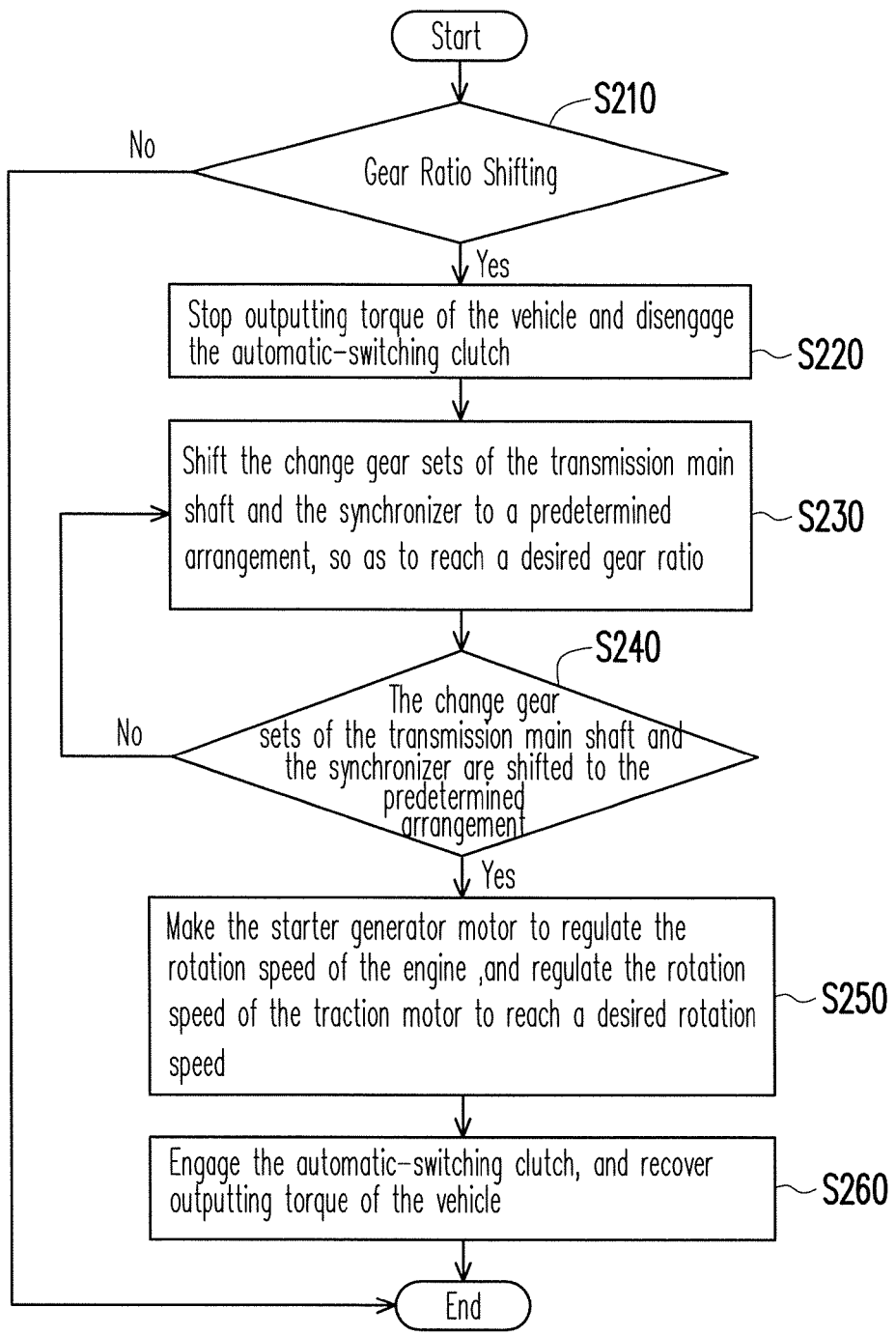
FIG. 11 is a schematic view of a control process for engaging and disengaging an engine and a traction motor by using an electromagnet actuated electromagnetic disc clutch and the gear ratio shifting process according to the first embodiment.

FIG. 11 is a schematic view of a control process for engaging and disengaging an engine and a traction motor by using an electromagnet actuated electromagnetic disc clutch and the gear ratio shifting process.

In step 210, the torque/rotation speed control device 510 determines whether or not to perform a gear ratio shifting process according to the control signal. If no, the gear ratio shifting process is terminated. Otherwise, proceed to the next step S220.

In the step S220, a torque of the vehicle is stopped outputting, then the automatic-switching clutch 500 is disengaged, and next the gear-shifting assembly mechanism 633 is in a neutral position.

In the step S230, the change gear sets of the transmission main shaft 650 and the synchronizer 630 are switched to a predetermined arrangement, such that the change gear sets of the transmission main shaft 650 and the synchronizer 630 achieve a desired gear ratio.

In the step S240, it is determined whether the change gear sets of the transmission main shaft 650 and the synchronizer 630 achieve the predetermined arrangement or not. If no, return to the previous step S230 of switching the change gear sets of the transmission main shaft 650 and the synchronizer 630 to the predetermined arrangement. If yes, proceed to the next step S250.

In step S250, starter generator motor control device 210 controls the starter generator motor 200 to regulate the rotation speed of the engine 100 to reach a desired rotation speed, and the traction motor control device 310 controls the rotation speed of the traction motor 300 to reach a desired rotation speed.

In step S260, the automatic-switching clutch 500 is engaged and the output of a torque of the vehicle is recovered.

[Centrifugal Clutch]

Figure 12:
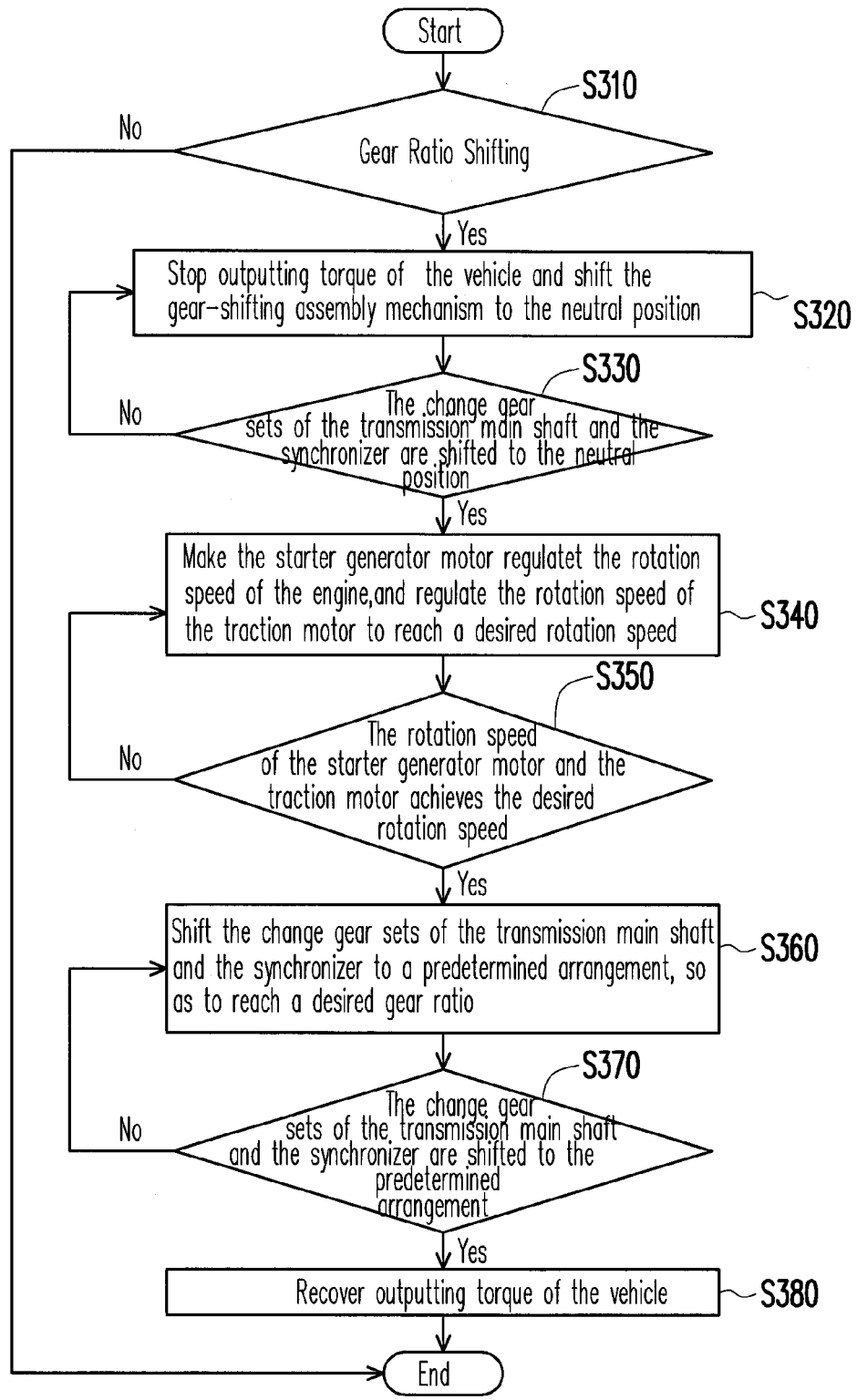
FIG. 12 is a schematic view of a control process for engaging and disengaging an engine and a traction motor by using a centrifugal clutch and the gear ratio shifting process according to the first embodiment.

FIG. 12 is a schematic view of a control process for engaging and disengaging an engine and a traction motor by using a centrifugal clutch and the gear ratio shifting process.

In the step 310, the torque/rotation speed control device 510 determines whether or not to perform a gear ratio shifting process according to the control signal. If no, the gear ratio shifting process is terminated. Otherwise, proceed to the next step S320.

In the step S320, a torque of the vehicle is stopped outputting and then the gear-shifting assembly mechanism 633 is switched to a neutral position.

In the step S330, it is determined whether the change gear sets of the transmission main shaft 650 and the synchronizer 630 are switched to a neutral position or not. If no, return to the previous step S330 of stopping outputting a torque of the vehicle, and switching the change gear sets of the transmission main shaft 650 and the synchronizer 630 to the neutral position. Otherwise, proceed to the next step S340.

In step S340, the starter generator motor 200 regulates the rotation speed of the engine 100, and the traction motor control device 310 regulate the rotation speed of the traction motor 300, so as to achieve a desired rotation speed.

In the step S350, it is determined whether the rotation speed of the starter generator motor 200 and the traction motor 300 reaches the desired rotation speed. If no, return to the previous step S340 of making the starter generator motor 200 to regulate the rotation speed of the engine 100, and regulating the rotation speed of the traction motor 300 by the traction motor control device 310, so as to achieve the desired rotation speed. Otherwise, proceed to the next step S360.

In the step S360, the change gear sets of the transmission main shaft 650 and the synchronizer 630 are switched to a predetermined arrangement, such that the change gear sets of the transmission main shaft 650 and the synchronizer 630 achieve a desired gear ratio.

In the step S370, it is determined whether the change gear sets of the transmission main shaft 650 and the synchronizer 630 achieve the predetermined arrangement or not. If no, return to the previous step S360 of switching the change gear sets of the transmission main shaft 650 and the synchronizer 630 to the predetermined arrangement, such that the change gear sets of the transmission main shaft 650 and the synchronizer 630 achieve the desired gear ratio. If yes, the output of a torque of the vehicle is recovered (the step S380).

According to the different operation states of the hybrid vehicle, i.e., different running states of the vehicle, the automatic manual transmission system 600 can switch to different gear positions to operate. When a gear ratio shifting process is needed, the hybrid vehicle control device 710 makes the gear-shifting electromagnetic disc 632 to actuate a transmission fork set 631. Then, after the gear-shifting electromagnetic disc 632 actuates the transmission fork set 631, the hybrid vehicle control device 710 makes the synchronizer 630 being in a neutral position.

The hybrid vehicle control device 710 sends a signal to both the starter generator motor control device 210 and the traction motor control device 310, so as to control the rotation speed of the starter generator motor 200 and the traction motor 300 accurately. When the automatic manual transmission system 600 is at the most appropriate rotation speed, the torque/rotation speed control device 510 makes the gear-shifting electromagnetic disc 632 to actuate the transmission fork set 631, such that the synchronizer 630 enters a desired gear position.

In this embodiment, the hybrid vehicle control device (master control device) 710 determines an optimal power according to the rotation speed and torque of the engine 100, and outputs a control signal.

According to the features of the present invention, by accurately controlling the rotation speed of the starter generator motor 200 and the traction motor 300, i.e., the dual-motor controlling, the automatic manual transmission system 600 changes speed more smoothly, thus improving the power transmission efficiency of the automatic manual transmission system. Since the rotation speed of the starter generator motor 200 and the traction motor 300 can be accurately controlled instantly, the transmission system performs the gear ratio shifting process at the most appropriate rotation speed, so as to reduce the abrasion of the gear-shifting device.

According to the features of the present invention, according to the running state of the vehicle, for example, the optimal power is determined according to the rotation speed and torque of the engine 100, and the engine and the traction motor are engaged or disengaged through the automatic-switching clutch. The engine operates only in the highest efficiency range of the operation efficiency curve of the engine, and the traction motor operates only in the highest efficiency range of the operation efficiency curve of the traction motor, so as to optimize the application efficiency of the power.

Since the motor and the control technique become mature, the hybrid power system of the present invention can be used in the development of vehicles having the advantages of power saving, low pollution, enhanced output, and better manipulation.

The Second Embodiment

The first embodiment takes the hybrid vehicle as an example. However, it can be known from the spirit of the present invention that the hybrid power system can be applied to different transportation tools and objects using power.

Figure 13:
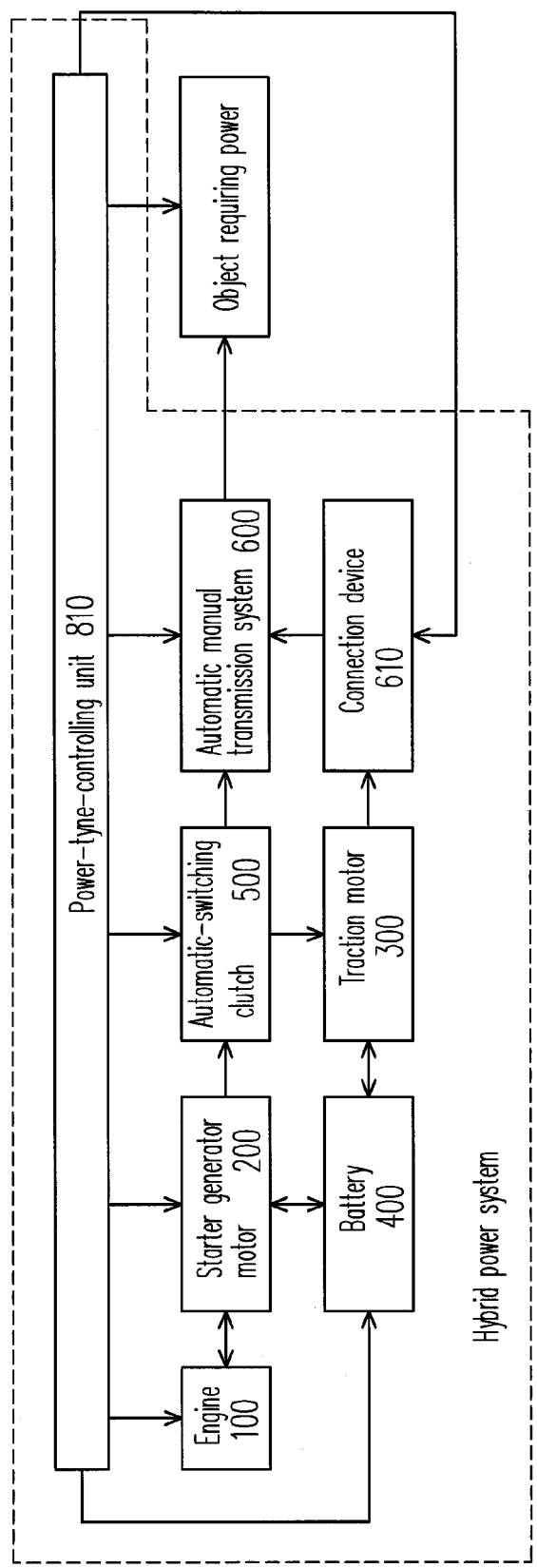
FIG. 13 is a block diagram of a hybrid power system and an object requiring power according to the second embodiment.

FIG. 13 is a schematic block diagram of a hybrid power system of a preferred embodiment of the present invention and an object requiring power.

The blocks enclosed by the dash line is the hybrid power system. In view of different objects requiring power, it is only needed to replace the tire set by the object using power. The same numerals are used to indicate the same elements appearing in different arrangement examples, so the details will be omitted.

According to the features of the present invention, the dual-motor control is used to make the automatic manual transmission system to change speed more smoothly, so as to improve the power transmission efficiency of the automatic manual transmission system.

According to the features of the present invention, since the rotation speed of the starter generator motor and the traction motor can be accurately controlled instantly, the transmission system performs the gear ratio shifting process at the most appropriate rotation speed, so as to reduce the abrasion of the gear-shifting device.

According to the features of the present invention, according to the operation state of the hybrid power system, for example, the optimal power is determined according to the rotation speed and torque of the engine, and the engine and the traction motor are engaged or disengaged through the automatic-switching clutch. The engine operates in the highest efficiency range of the operation efficiency curve of the engine, and the traction motor operates only in the highest efficiency range of the operation efficiency curve of the traction motor, so as to optimize the application efficiency of the power.

According to the features of the present invention, when the automatic manual transmission system having multiple gear positions is used, the automatic manual transmission system changes between different gear positions to operate according to the changes of the operating state of the hybrid power system.

Though the present invention has been disclosed above by the preferred embodiments, they are not intended to limit the present invention. Anybody skilled in the art can make some modifications and variations without departing from the spirit and scope of the present invention. Therefore, the protecting range of the present invention falls in the appended claims and their equivalents.

What is claimed is:

1. An operation method of a hybrid vehicle having an automatic manual transmission system adapted to use at least two energy sources, the operation method comprising:
    engaging an engine with a starter generator motor such that the engine and the starter generator motor rotate synchronously;
    using the starter generator motor to start the engine serving as a first power, and using a traction motor as a second power;
    performing a speed changing by using a control unit assembly through controlling a rotation speed of the traction motor to a desired rotation speed for the speed changing and a rotation speed of the starter generator motor to a desired rotation speed for the speed changing according to a running state of the vehicle, such that the engine and the traction motor nearly rotate synchronously with the automatic manual transmission system to perform a gear ratio shifting process thereby to perform the speed changing; and
    controlling an automatic-switching clutch to engage or disengage the engine and the traction motor by using the control unit assembly through a torque/rotation speed control device to achieve a plurality of driving modes for the vehicle, wherein one of the driving modes uses the starter generator motor as an assistant power, using the control unit assembly comprising:
        sending a control signal according to the running state of the vehicle with a hybrid vehicle control device;

controlling an operation of the engine with an engine control device according to the control signal;

controlling an operation of the starter generator motor with a starter generator motor control device according to the control signal;

controlling an operation of the traction motor with a traction motor control device according to the control signal;

controlling an operation of the speed changing with a torque/rotation speed control device according to the control signal, wherein the torque/rotation speed control device controls the automatic-switching clutch to engage or disengage the engine and the automatic manual transmission system and controls the automatic manual transmission system to perform the speed changing by controlling the rotation speed of the starter generator motor and the rotation speed of the traction motor;

controlling a battery coupled to the starter generator motor and the traction motor to be turned on or turned off according to the control signal; and determining an optimal power type according to the rotation speed and a torque of the engine, and outputting the control signal and selecting a mode from among a pure electric power mode, a pure engine power mode, a series hybrid power mode, an assistant hybrid power mode, and a parallel hybrid power mode, wherein:

when the pure electric power mode is selected, the control signal is transferred to the torque/rotation speed control device for controlling the automatic-switching clutch to disengage the engine from the automatic manual transmission system, and stopping the operation of the engine, and only the traction motor is used to drive the vehicle;

when the series hybrid power mode is selected, the control signal is transferred to the torque/rotation speed control device for controlling the automatic-switching clutch to disengage the engine from the automatic manual transmission system, and controlling the engine to drive the starter generator motor to generate a power and to supply the power to the battery, and the battery supplies the power to the traction motor, such that the traction motor drives the vehicle;

when the pure engine power mode is selected, the control signal is transferred to the torque/rotation speed control device for controlling the automatic-switching clutch to engage the engine with the automatic manual transmission system, and stopping the operation of the traction motor, and only the engine is used to drive the vehicle;

when the assistant hybrid power mode is selected, the control signal is transferred to the torque/rotation speed control device for controlling the automatic-switching clutch to engage the engine with the automatic manual transmission system, and the engine, the starter generator motor, and the traction motor are used together to drive the vehicle; and when the parallel hybrid power mode is selected, the control signal is transferred to the torque/rotation speed control device for controlling the automatic-switching clutch to engage the engine and the automatic manual transmission system, and the starter generator motor supplies a power to the battery or not according to the running state of the vehicle, and the engine and the traction motor are used to drive the vehicle.

2. The operation method as claimed in claim 1, wherein the automatic-switching clutch is an electromagnet-actuated electromagnetic disc clutch.

3. The operation method as claimed in claim 1, wherein the automatic manual transmission system comprises a gear-shifting assembly mechanism and a change gear set, the automatic-switching clutch is an electromagnet-actuated electromagnetic disc clutch, and the operation method further comprises determining whether or not to perform the gear ratio shifting process according to the control signal, wherein if the gear ratio shifting process is not to be performed, the gear ratio shifting process is terminated, otherwise, the gear ratio shifting process is to be performed in sequence as in following steps:

(a) stopping outputting a torque of the vehicle, and controlling the automatic-switching clutch to disengage the engine from the automatic manual transmission system;

(b) shifting the change gear set to a predetermined arrangement, such that the change gear set reaches a desired gear ratio;

(c) determining whether the change gear set reaches the predetermined arrangement or not, if the change gear set does not reach the predetermined arrangement, returning to step (b); and if the change gear set reaches the predetermined arrangement, proceeding step (d);

(d) controlling the starter generator motor through the starter generator motor control device to regulate the rotation speed of the engine to reach a desired rotation speed for the speed changing and regulating the traction motor through the traction motor control device to reach the desired rotation speed for the speed changing; and (e) controlling the automatic-switching clutch through the torque/rotation speed control device to engage the engine with the automatic manual transmission system and resuming outputting the torque of the vehicle.

4. The operation method as claimed in claim 1, wherein the automatic manual transmission system comprises a gear-shifting assembly mechanism and a change gear set, the automatic-switching clutch is a centrifugal clutch, and the operation method further comprises determining whether or not to perform the gear ratio shifting process according to the control signal, wherein if the gear ratio shifting process is not to be performed, the gear ratio shifting process is terminated, otherwise, the gear ratio shifting process is to be performed in sequence as in following steps:

(a) stopping outputting a torque of the vehicle and shifting the gear-shifting assembly mechanism to a neutral position;

(b) determining whether the change gear set is shifted to the neutral position, if the change gear set is not shifted to the neutral position, returning to step (a), otherwise, proceeding step (c);

(c) controlling the starter generator motor through the starter generator motor control device to regulate the rotation speed of the engine to reach the desired rotation speed for the speed changing and regulating the rotation speed of the traction motor through the traction motor control device to reach the desired rotation speed for the speed changing;

(d) determining whether the rotation speed of the starter generator motor reaches the desired rotation speed for the speed changing and the rotation speed of the traction motor reaches the desired rotation speed for the speed changing or not, if no, returning to step (c), otherwise, proceeding to step (e);

(e) shifting the change gear set to a predetermined arrangement, so as to reach a desired gear ratio; and (f) determining whether the change gear set achieves the predetermined arrangement, if the change gear set does not achieve the predetermined arrangement, returning to step (e), otherwise, resuming outputting the torque of the vehicle.

5. The operation method as claimed in claim 1, further comprising coupling the automatic manual transmission system with the traction motor through a connection device.

6. The operation method as claimed in claim 5, wherein the connection device comprises a gear set.

7. The operation method as claimed in claim 5, wherein the connection device comprises a sprocket and a chain set.

8. The operation method as claimed in claim 5, wherein the connection device comprises a belt and a pulley set.

* * * * *